United States Patent [19]

Diehl et al.

[11] Patent Number: 5,283,165

[45] Date of Patent: Feb. 1, 1994

[54] PYRROLINONE DYES

[75] Inventors: Donald R. Diehl; Margaret J. Helber; Louis J. Rossi, all of Rochester, N.Y.

[73] Assignee: Eastman Kodak Company, Rochester, N.Y.

[21] Appl. No.: 995,436

[22] Filed: Dec. 23, 1992

[51] Int. Cl.$^5$ .............................................. G03C 1/84
[52] U.S. Cl. .................... 430/522; 430/517; 548/545
[58] Field of Search ................ 430/522, 517; 548/545

[56] References Cited

U.S. PATENT DOCUMENTS

| 3,753,721 | 8/1973 | Millikan et al. | 96/130 |
| 4,234,677 | 11/1980 | Postle | 430/518 |
| 4,923,788 | 5/1990 | Shuttleworth et al. | 430/507 |
| 4,968,595 | 11/1990 | Yamada et al. | 430/567 |
| 5,011,811 | 4/1991 | Shuttleworth et al. | 503/201 |
| 5,155,015 | 10/1992 | Jimbo | 430/517 |

FOREIGN PATENT DOCUMENTS

| 0158262 | 1/1984 | Japan . |
| 3228145 | 3/1987 | Japan . |
| 4-009042 | 5/1992 | Japan . |

OTHER PUBLICATIONS

"Search for New Antispasmodics Part VII", by T. N. Ghosh and Saktipada Dutta, Jour. Indian Chem. Soc., vol. 32, No. 12, pp. 791-792 (1955).

"Kondesation von 1,2-Diketonen mit 2-Cyanacetamid" by H. Roeber and K. Hartke, Chem. Bar. 108, pp. 3262-3270 (1975).

"Substituience 2-Amino- und 2-Hydroxy-pyrrole aus Ylidennitrilen" by K. Gewald, U. Hain, Synthesis, pp. 62-63 (Sep. 1984).

"Die Umsetzung von Azlactonen mit CH-aciden Verbindungen. 2. Mitteil. (1)" by Hans-Dietrich Stachel, K. Klaus Harigel, Hermann Poschenrieder and Hans Burghard, J. Heterocyclic Chem., 17, pp. 1195-1199 (Sep. 1980).

"Staying on the Surface" by Cecilia Anseimi, Chemtech, pp. 99-104, (Feb. 1992).

Primary Examiner—Jack P. Brammer
Attorney, Agent, or Firm—Gordon M. Stewart

[57] ABSTRACT

Pyrrolinone dyes, and photographic materials containing them, which dyes have the formula:

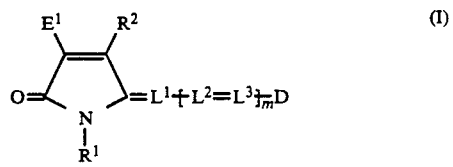

wherein;

$E^1$ represents an electron withdrawing group;

$R^1$ represents an aryl group of 6 to 14 carbon atoms or an alkyl group of from 1 to 12 carbon atoms;

$R^2$ represents an alkyl or alkylthio group of 1 to 20 carbon atoms, or an alkenyl group of 2 to 20 carbon atoms, or an aryl, aralkyl, heterocyclic or cycloalkyl group any of which have 5 to 14 carbon atoms, or R2 represents a hydroxy, cyano, chloro, nitro or hydrogen;

$M^+$ is a cation;

each L represents a methine group;

m is 0, 1, 2, or 3; and D is a moiety in conjugation with the oxygen of the pyrollinone ring.

The dyes are particularly useful as solid particle filter dye dispersions in photographic elements.

26 Claims, No Drawings

PYRROLINONE DYES

FIELD OF THE INVENTION

This invention relates to dyes and, more particularly, to novel pyrrolinone dyes that are useful in photographic materials.

BACKGROUND OF THE INVENTION

A wide variety of dyes is employed in photographic materials. In addition to diverse dyes used to form images in color photographic elements, spectral sensitizing dyes are used to extend the sensitivity of silver halides, which are inherently sensitive only to blue light, to other wavelengths of radiation. Among the dyes commonly employed for this purpose are the cyanines and merocyanines, which are discussed in T. H. James, editor, *The Theory of the Photographic Process.* 4th Edition, Macmillan, New York, 1977, Chapter 8, and in F. M. Hamer, *Cyanine Dyes and Related Compounds,* Wiley, New York, 1964.

Dyes are also used in color photographic materials as filters, typically located in overcoats, interlayers or undercoats, to absorb incident radiation and improve image sharpness. Intergrain absorber dyes may also be added directly to a spectrally sensitized silver halide emulsion to absorb light and thereby modify the sensitivity of the emulsion. In addition to the previously mentioned cyanine and merocyanines, various oxonol and arylidene dyes are frequently utilized for these purposes. A discussion of arylidene dyes can be found in K. Venkataraman, *The Chemistry of Synthetic Dyes,* Academic Press, New York, 1970, Volume III.

The pyrrolin-2-one nucleus can exist in the isomeric forms shown below.

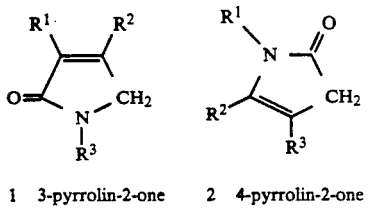

1  3-pyrrolin-2-one     2  4-pyrrolin-2-one

Structures of the type 1 above which contain an electron withdrawing group in the $R^1$ position are only lightly described in the literature. For example T. N. Ghosh and S. Dutta in *J. of Indian Chemical Society,* Vol. 32, page 791, 1955 describe the synthesis of 3-pyrrolin-2-one compounds in which $R^1$ is cyano, $R^2$ is phenyl and $R^3$ is acetyl or hydrogen as side products in their search for antispasmotic materials, and K. Gewald and U. Hain in *Synthesis,* page 62, 1984 describe the preparation of the 3-pyrrolin-2-one compound in which $R^1$ is cyano, $R^2$ is methyl and $R^3$ is phenyl by hydrolytic cleavage of a dihydropyridazin-3-one. No reference is made to dyes in either of these articles. H. Stachel, et. al., in *J. Heterocyclic Chem.,* Vol. 17, page 1195, 1980 describe the synthesis of arylmethylene derivatives of 3-pyrrolin-2-one compounds in which $R^1$ is cyano, $R^2$ is hydroxy and $R^3$ is benzoyl or hydrogen, and K. Hartke and H. Roeber in *Chem. Ber.,* Vol. 108, page 3262, 1975 describe the preparation of an arylmethylene derivative of 3-pyrrolin-2-one compounds in which $R^1$ is cyano, $R^2$ is benzyl and $R^3$ is hydrogen.

Recently, C. Anselmi in *ChemTech,* page 99, 1992 reports the investigation of arylmethylene derivatives of 3-pyrrolin-2-one compounds in which $R^1$ is aryl, $R^2$ is methyl, and $R^3$ is alkyl or hydrogen as ultraviolet filtration agents in skin sunscreen formulations. Oxonol dyes for photographic materials prepared from the 4-pyrrolin-2-one compounds, type 2 above, have recently been described in Japanese Patent 103523. Japanese Patent application 013921 relate to maleimide textile dyes, and patents U.S. Pat. Nos. 5,011,811 and 4,923,788 relate to cyanofuranone dyes.

It would be desirable then to have a new class of dyes which are particularly useful for photographic applications, in particular as filter dyes in photographic elements.

SUMMARY OF THE INVENTION

We have now found that a wide variety of 3-pyrrolin-2-one compounds, of formula 1 above, can be conveniently prepared from amines or substituted amines, and further that novel merocyanine, oxonol, and arylidene dyes with utility in silver halide photographic materials can be synthesized as described herein.

Broadly, dyes of the present invention have a 3-position electron withdrawing group, and a moiety in conjugation with the 2-position oxygen which moiety is linked to the pyrrolinone ring 5-position through a substituted or unsubstituted methine bridge, and in which dye the pyrrolinone ring nitrogen has a substituent other than hydrogen.

In a preferred aspect of the invention, the dyes of the present invention are of the formula I below:

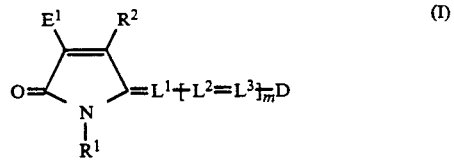

wherein;

$E^1$ represents an electron withdrawing group;

$R^1$ represents an aryl group of 6 to 14 carbon atoms, or an alkyl group of from 1 to 12 carbon atoms;

$R^2$ represents an alkyl or alkylthio group of 1 to 20 (preferably 1 to 8) carbon atoms, an alkenyl group of 2 to 20 (preferably 2 to 8) carbon atoms, or an aryl, aralkyl, heterocyclic or cycloalkyl group of 5 to 14 carbon atoms, or a hydroxy, cyano, chloro, nitro or hydrogen;

$M^+$ is a cation; each L represents a methine group (this including the possibility of any of them being members of a 5 or 6 membered ring where $m=1$, or particularly when $m>1$);

m is 0, 1, 2, or 3; and D is a moiety in conjugation with the oxygen of the pyrrolinone ring.

The present invention also provides photographic elements containing dyes of the foregoing types.

EMBODIMENTS OF THE INVENTION

In formula I above, $R^1$ groups of up to 12 carbon atoms may particularly include aryl groups such as phenyl, or cycloalkyl groups such as a substituted or unsubstituted cyclohexyl. $R^2$ may particularly be a group containing a benzene ring (for example, a substituted or unsubstituted phenyl ring) or may be the alkyl group trifluoromethyl. D preferably contains an atom with an available electron pair positioned in conjugation with the oxygen of the pyrrolinone ring which atom is an O, N, Se or S, or is a C with at least one electron withdrawing group bonded thereto, or D may be a group containing a benzene ring. D may particularly contain an O or N atom, or a $-C(CN)_2$ positioned in conjugation with the oxygen of the pyrrolinone ring. By being positioned in "conjugation" with the oxygen, it is meant that there is a conjugated system between the oxygen and the atom of D. Such systems are generally known in organic chemistry and refer to a chain in which a single bond, and a double or triple bond, appear alternately. Particular groups for D include:

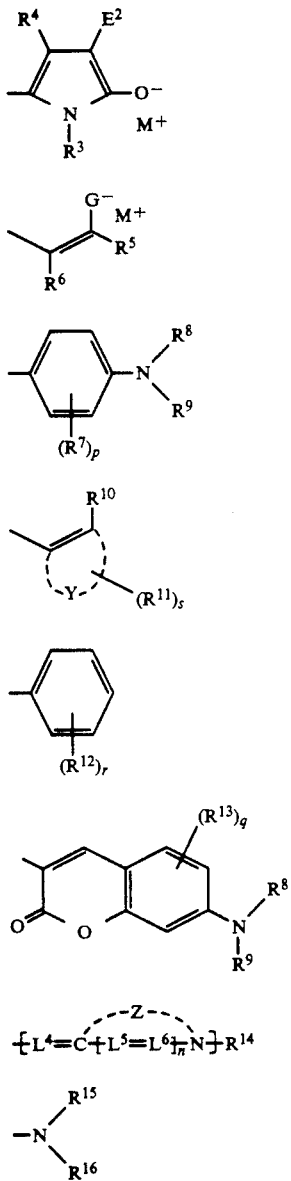

In the above, $E^2$ represents an electron withdrawing group. $R^3$ represents an aryl group (which includes substituted or unsubstituted aryl) preferably of 6 to 14 carbon atoms, or an alkyl group of from 1 to 12 carbon atoms. $R^4$ represents an alkyl or alkylthio group preferably of 1 to 20 (preferably 1 to 8) carbon atoms, or an alkenyl group of 2 to 20 (preferably of 2 to 8) carbon atoms; or an aryl, aralkyl, heterocyclic or cycloalkyl group preferably of 5 to 14 carbon atoms. Alternatively, $R^4$ can represent a hydroxy, cyano, chloro, nitro or hydrogen. $R^5$ represents an alkyl group ("group" wherever used in the present application including the possibility of being substituted or unsubstituted alkyl) of 1 to 20 (preferably 1 to 8) carbon atoms or an alkenyl group of 2 to 20 (preferably of 2 to 8) carbon atoms; or an aryl, aralkyl, heterocyclic or cycloalkyl group preferably of 5 to about 14 carbon atoms. $R^6$ is also an electron withdrawing group. Electron withdrawing substituents are discussed in March, *Advanced Organic Chemistry*, pages 20–21, 228–229, 386–387, 494–497. In particular, preferred electron withdrawing substituents would have a Hammett $\sigma_p$ constant of greater than 0.1 and preferably between 0.1 and 1.0 (for example, between any of 0.3, 0.4, 0.5 or 0.6 and 1.0). Hammett $\sigma_p$ values are discussed in *Advanced Organic Chemistry* 3rd Ed., J. March, (John Wiley Sons, N.Y.; 1985). Note that the "p" subscript refers to the fact that the $\sigma$ values are measured with the substituents in the para position of a benzene ring. Additional tables relating to Hammett $\sigma_p$ constants can be found in *Chemical Reviews* Volume 91, pages 165–195 (authored by C Hansch et al.). Groups for $E^1$, $E^2$ and $R^6$ may include cyano, acyl, benzoyl, phenacyl, aminocarbonyl, alkoxycarbonyl, aryl, or alkylsulfonyl group (any of which particularly may have 2 to 20, and preferably of 2 to 8, carbon atoms), or an arylsulfonyl or any sulfamoyl group (either particularly including those of 1 to 8, and preferably 1 to 20, carbon atoms). Alternatively, $R^5$ and $R^6$ may together represent the non-metallic atoms necessary to complete a substituted or unsubstituted ring containing at least one 5- or 6-membered heterocyclic or unsaturated alicyclic nucleus.

$R^7$, $R^{10}$, $R^{11}$, $R^{12}$ and $R^{13}$ each individually represents hydrogen, carboxy, carboxyalkyl, sulfonamido, sulfamoyl, or an alkyl, aralkyl, cycloalkyl, alkoxy, alkylamino, or alkylthio group preferably of 1 to 10 carbon atoms. $R^5$, $R^8$, $R^9$, $R^{15}$, and $R^{16}$ each individually represents an alkyl group preferably of 1 to 20 (and more preferably 1 to 8) carbon atoms or an alkenyl group preferably of 2 to 8 carbon atoms, or an aryl, aralkyl, heterocyclic or cycloalkyl group preferably of 5 to about 14 carbon atoms. Alternatively, $R^8$ and $R^9$, or $R^{15}$ and $R^{16}$ together represent the non-metallic atoms required to form a substituted or unsubstituted 5- or 6-membered ring with each other, or $R^8$ and $R^9$ individually represent the non-metallic atoms necessary to form a substituted or unsubstituted 5- or 6-membered fused ring with the phenyl ring to which the nitrogen is attached. $R^{14}$ represents an alkyl group preferably of 1 to about 8 carbon atoms, or an aralkyl or cycloalkyl group preferably of 5 to about 10 carbon atoms. G represents $-O$ or $-C(CN)_2$.

Y and Z individually represent the non-metallic atoms necessary to complete a substituted or unsubstituted ring system containing at least one 5- or 6-membered heterocyclic nucleus.

The group formed by Y includes pyridine, pyrazole, pyrrole, furan, thiophene, and the like, or fused ring systems such as indole, benzoxazole, and the like.

The atoms represented by Z can complete a 5- or 6-membered heterocyclic nucleus, which can be fused with additional substituted or unsubstituted rings such as a benzo ring. Suitable heterocyclic nuclei are of the type commonly used in sensitizing dyes and are well known in the art. Many are described, for example, in the previously mentioned James, *The Theory of the Photographic Process*, 4th Edition, pages 195–203. Useful heterocyclic nuclei include thiazole, selenazole, oxazole, imidazole, indole, benzothiazole, benzindole, naphthothiazole, naphthoxazole, benzimidazole, and the like. In a preferred embodiment, Z represents the atoms necessary to complete a substituted or unsubstituted benzoxazole or benzothiazole nucleus.

M+ is a cation. $L^1$ through $L^6$ each individually represents a methine group which may be substituted or unsubstituted. The foregoing includes the possibility that any of them may be members of a 5 or 6 membered ring. m is 0, 1, 2, or 3. n is 0 or 1. p is 0, 1, 2, 3, or 4. q is 0, 1, 2, or 3. r is 0, 1, 2, 3, 4, or 5. s is 0, 1, or 2.

In the above formulae for D, D4 may particularly have the structure:

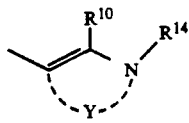

(D9)

Active methylene moieties of D2, as represented by

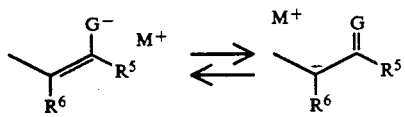

where G represents O, are well known in the art and are described, for example, in the previously mentioned Hamer, *Cyanine Dyes and Related Compounds*, pages 469-494 and 595-604. In accordance with the present invention, preferred active methylene groups include those derived from benzoylacetonitrile, 2-pyrazolin-5-one, pyrazolidindione, barbituric acid, rhodanine, indandione, benzofuranone, chromandione, cyclohexanedione, dioxanedione, furanone, isoxazolinone, pyrazolopyridine, pyridone, isoxazolidinedione, pyrandione, and tricyanopropene ($R^6$=CN, G=C(CN)$_2$). M+ is a cation such as H+, Et$_3$NH+, C$_5$H$_5$NH+, Na+, K+, and the like.

$L^1$ through $L^6$ are methine groups (the term "group", as already mentioned, is used in this application to include substituted or unsubstituted). Substituents on $L^1$ through $L^6$ may include a substituted or unsubstituted alkyl, alkenyl, aryl, aralkyl, chloro or acetoxy, or cycloalkyl group, as described above for $R^2$ and $R^4$. Any of $L^1$ through $L^6$ may be members of a carbocyclic or heterocyclic ring (particularly a 5- or 6-membered ring of either type), such as cyclopentyl, cyclohexyl, and the like. It will be understood that this possibility is within the definition of substituted methines ("substituted" methines being included in the term "group" in reference to methines, as previously discussed). For example, when m=1, and particularly when m>1, $L^1$ through $L^3$ (particularly $L^2$ and $L^3$) can be members of any of the foregoing types of rings (and are therefore considered "substituted").

Examples of any of the alkyl groups mentioned above are methyl, ethyl, propyl, isopropyl, butyl, isobutyl, t-butyl, pentyl, hexyl, octyl, 2-ethylhexyl, and the like. Cycloalkyl groups can be cyclopentyl, cyclohexyl, 4-methylcyclohexyl, and the like. Alkenyl groups can be vinyl, 1-propenyl, 1-butenyl, 2-butenyl, and the like. Aryl groups can be phenyl, naphthyl, styryl, and the like. Aralkyl groups can be benzyl, phenethyl, and the like. Useful substituents on any of the foregoing or other groups disclosed, include halogen, alkoxy, acyl, alkoxycarbonyl, aminocarbonyl, carbonamido, carboxy, sulfamoyl, sulfonamido, sulfo, nitro, hydroxy, amino and the like.

The dyes of the present invention can be prepared by condensation of a suitably substituted 3-pyrrolin-2-one compound with electrophilic compounds containing a leaving group such as anilino, acetamido, alkoxy, hydroxy, and the like, or by condensation with aldehydes and ketones. These condensation reactions, which are well known in the sensitizing dye art, are discussed in the previously mentioned James, *The Theory of the Photographic Process*, pages 206–211, incorporated herein by reference.

The 3-pyrrolin-2-one compounds of the present invention can be prepared by Method A or Method B as shown.

Method A

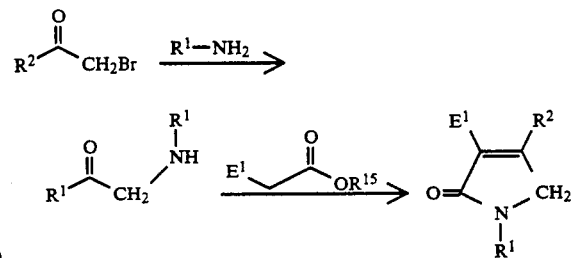

Method B

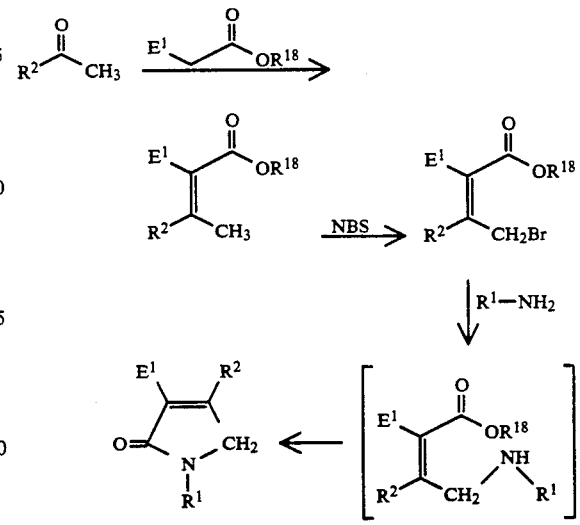

$R^1$, $R^2$ and $E^1$ are substituents of the 3-pyrrolin-2-one compounds and represent groups as defined above. $R^{18}$ represents an alkyl group such as methyl, ethyl, or the like. Preparation of the 3-pyrrolin-2-one compounds by Method A is preferred in the cases in which $R^2$ is aryl, and preparation by Method B is preferred when $R^2$ is alkyl.

The pyrrolinone dyes of the present invention are potentially useful in a wide variety of photographic and non-photographic application. One example of an application of these dyes in photographic materials is in solid particle filter dye dispersions, as previously disclosed in U.S. Pat. Nos. 4,803,150; 4,855,221; 4,857,446; 4,900,653; 4,900,654; and 5,098,820. Solid particle dispersions of compounds of formula (I) may be useful as general purpose filter dyes, alone or in combination with other filter dyes in photographic elements. In such an application the particles might have an average particle size of 0.01 μm to 100 μm, preferably 0.1 μm to 10 μm, and more preferably 0.1 μm to 2 μm. Dyes of the formula (I) incorporated into solid particle dispersions require the presence of at least one base-ionizable functionality including, but not restricted to, carboxy (—COOH), sulfonamido (—NHSO$_2$R$^{19}$) or sulfamoyl (—SO$_2$NHR$^{20}$) where R$^{19}$ and R$^{20}$ represent groups as defined above for R$^2$ and R$^4$. In addition, R$^{20}$ can be hydrogen.

Dyes incorporated into solid particle dispersions as described above should not be substituted with strongly acidic groups such as sulfo, (SO$_3$—), which would tend to increase the solubility of the dye sufficiently to cause dissolution of the dye at pH's employed during coating of the photographic element. As a result, solid particle filter dye dispersions of such dyes of the present invention will be insoluble at coating pH's of 6 or less (generally 4 to 6) and soluble at processing pH's of 8 or more (generally 8 to 12). Thus, they do not interact with other components of the photographic elements during coating or storage but are fully solubilized during photographic processing.

Water soluble filter dyes of the formula (I) can also be used either within a silver halide emulsion layer as an intergrain absorber or immobilized by cationic mordants in a separate layer, or coated in a layer on the support on the side opposite to the layers containing silver halide emulsions. Dyes of formula (I) used in this manner would incorporate one or more solubilizing groups such as sulfo (—SO$_3^-$) or sulfato (—OSO$_3^-$). Such dyes would readily wash out of the silver halide emulsions upon normal photographic processing.

Amounts of dyes described which can be used in photographic elements of the present invention can vary widely. Particularly the amount used in such elements is from 0.1 mg/m$^2$ to 1000 mg/m$^2$, or preferably from 1 mg/m$^2$ to 100 mg/m$^2$.

Dyes which are not removed from photographic elements can also be useful, particularly in color negative materials as printer compatibility dyes to add D$_{min}$ at desired wavelenghts. Dyes of the present invention can also be used as a tint in photographic element supports. Furthermore, at least some dyes of the present invention can also be used as spectral sensitizers for silver halide, and the present invention includes photographic elements with silver halide spectrally sensitized by dyes of the present invention.

More generally, dyes of the present invention may be incorporated in a hydrophilic layer of a photographic element which is either a radiation sensitive layer or a non-radiation sensitive layer. Further, the dyes may be located on the same side of a support of a photographic element as a radiation sensitive layer, or on the opposite side of the support. More specifically, the dyes (either particle or water soluble) would be incorporated in an anti-halation layer or an anti-halation subbing layer.

More generally, dyes of the present invention may be incorporated in a hydrophilic layer of a photographic element which is either a radiation sensitive layer or a non-radiation sensitive layer. Further, the dyes may be located on the same side of a support of a photographic element as a radiation sensitive layer, or on the opposite side of the support. More specifically, the dyes (either particle or water soluble) could be incorporated in an anti-halation layer or an anti-halation subbing layer.

Representative pyrrolinone merocyanine dyes of the present invention are shown in Table 1, pyrrolinone arylidene dyes are shown in Table 2, pyrrolinone oxonol dyes in Table 3, and miscellaneous pyrrolinone dyes in Table 4. Table 5 below lists solution absorbance maxima for some representative dyes of the present invention. The examples below further illustrate the present invention.

TABLE 1

3-Pyrrolin-2-one Merocyanine Dyes

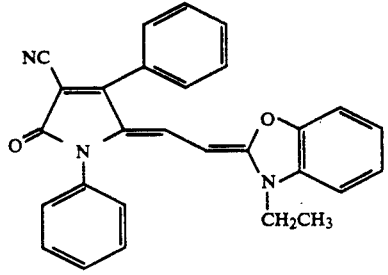

Dye 1

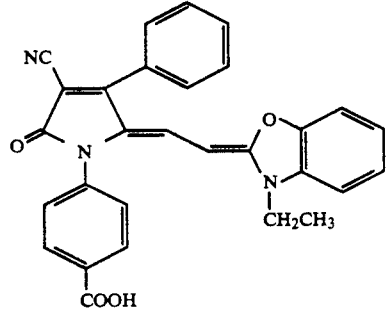

Dye 2

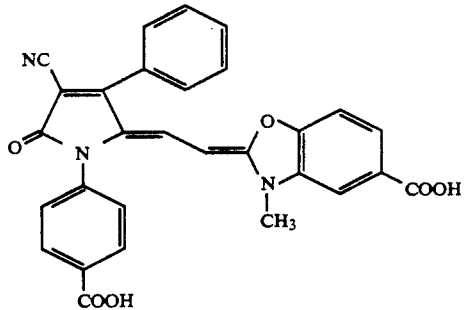

Dye 3

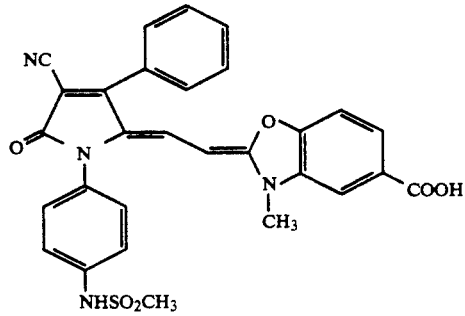

Dye 4

TABLE 1-continued
3-Pyrrolin-2-one Merocyanine Dyes
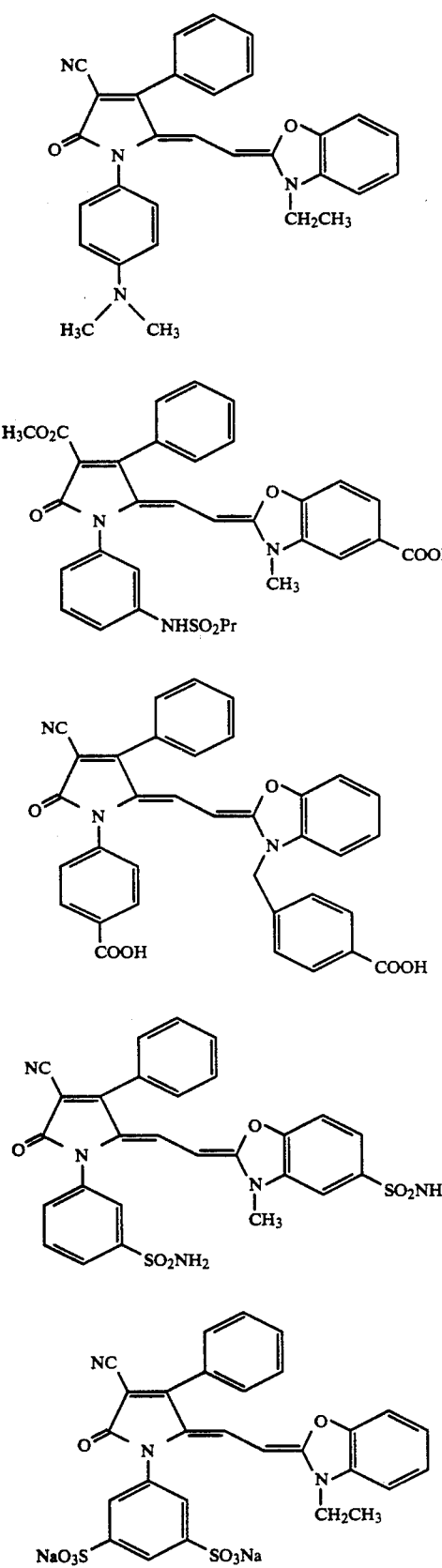
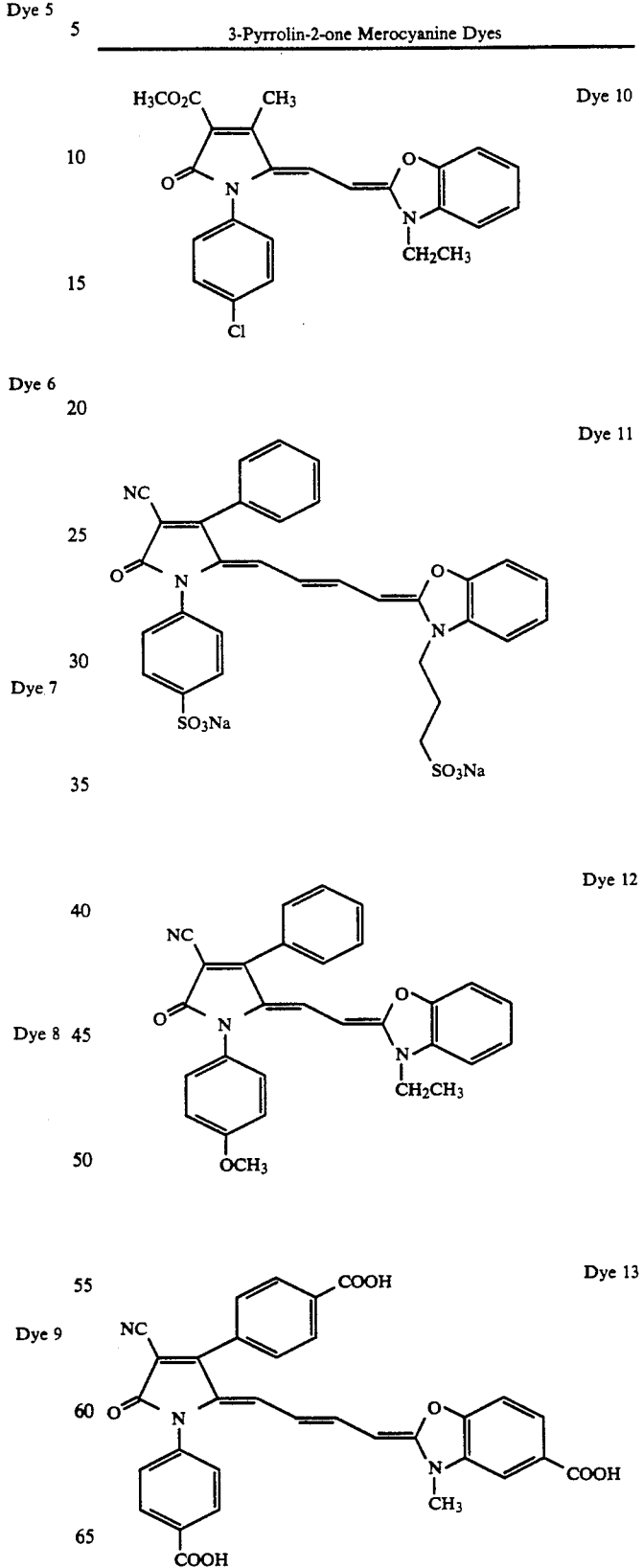

TABLE 1-continued
3-Pyrrolin-2-one Merocyanine Dyes
Dye 14
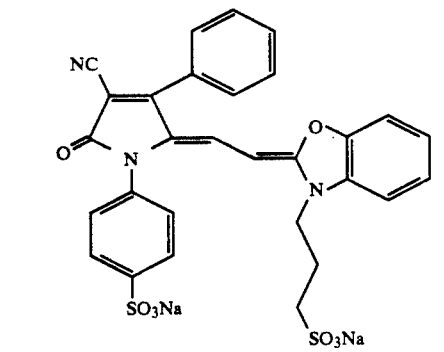
Dye 15
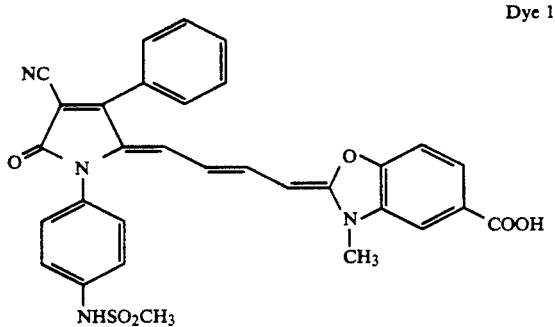
Dye 16
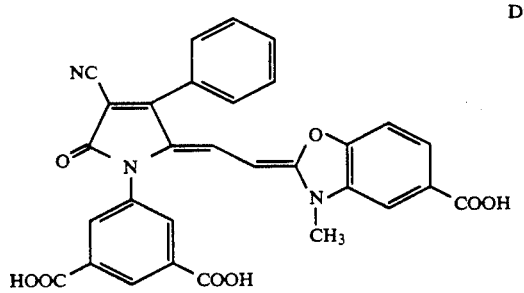
Dye 17
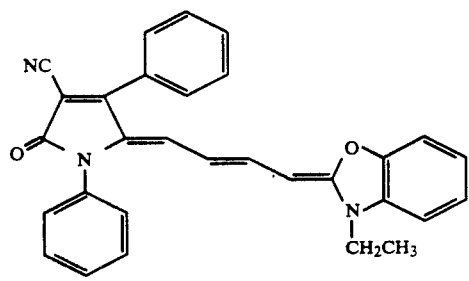
Dye 18
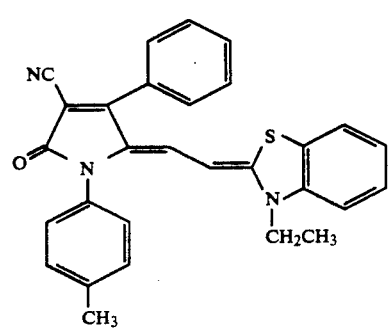
TABLE 1-continued
3-Pyrrolin-2-one Merocyanine Dyes
Dye 19
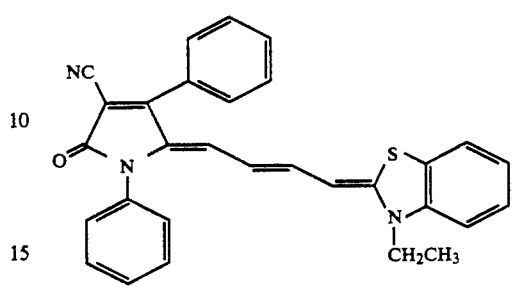
Dye 20
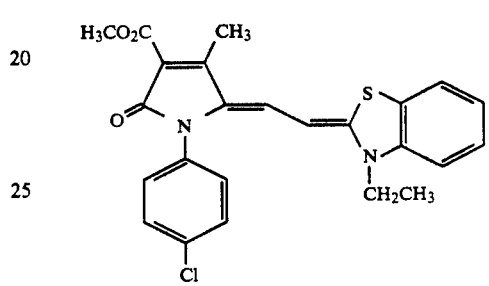
Dye 21
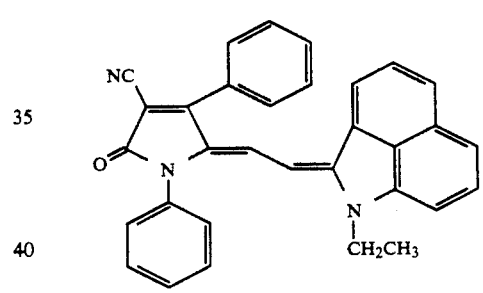
Dye 22
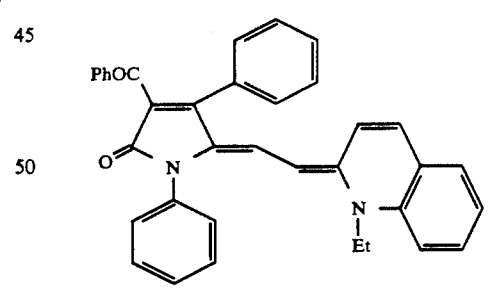
Dye 23
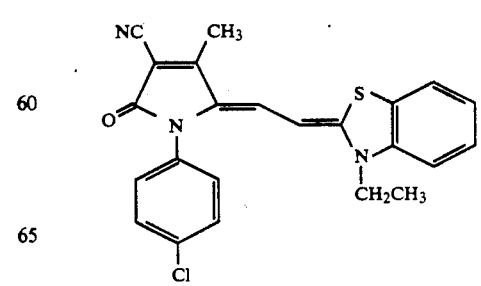

TABLE 1-continued
3-Pyrrolin-2-one Merocyanine Dyes
Dye 24
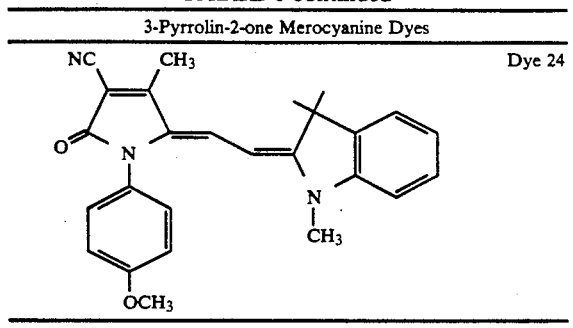
TABLE 2
3-Pyrrolin-2-one Arylidene Dyes
Dye 25, Dye 26, Dye 27, Dye 28
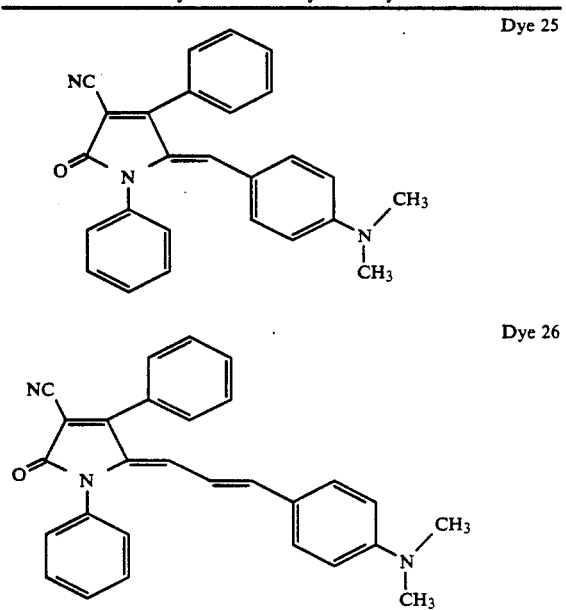
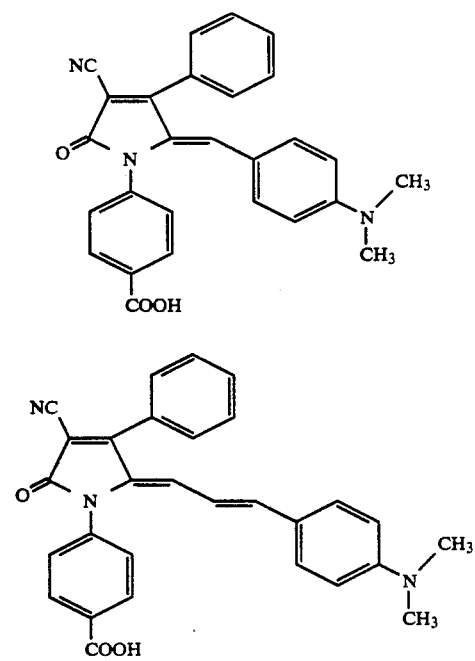
TABLE 2-continued
3-Pyrrolin-2-one Arylidene Dyes
Dye 29
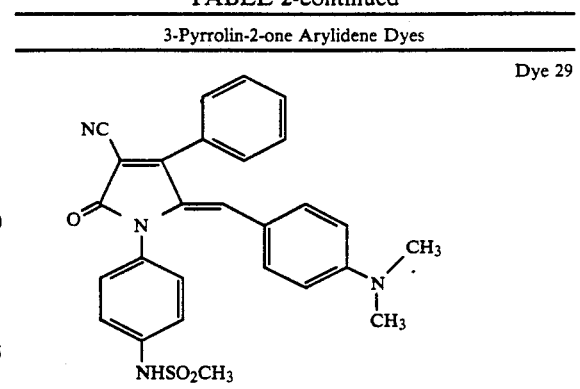
Dye 30, Dye 31, Dye 32, Dye 33
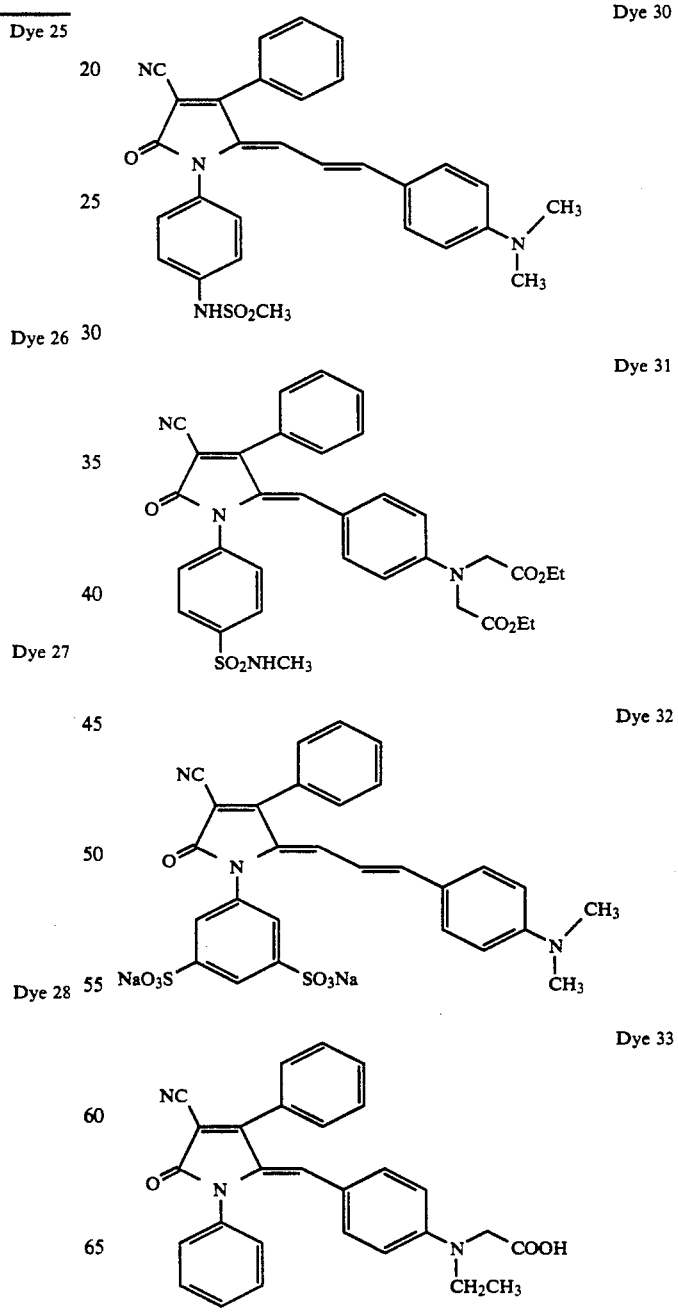

TABLE 2-continued

3-Pyrrolin-2-one Arylidene Dyes

Dye 34, Dye 35, Dye 36, Dye 37, Dye 38, Dye 39, Dye 40, Dye 41, Dye 42, Dye 43

TABLE 2-continued
3-Pyrrolin-2-one Arylidene Dyes
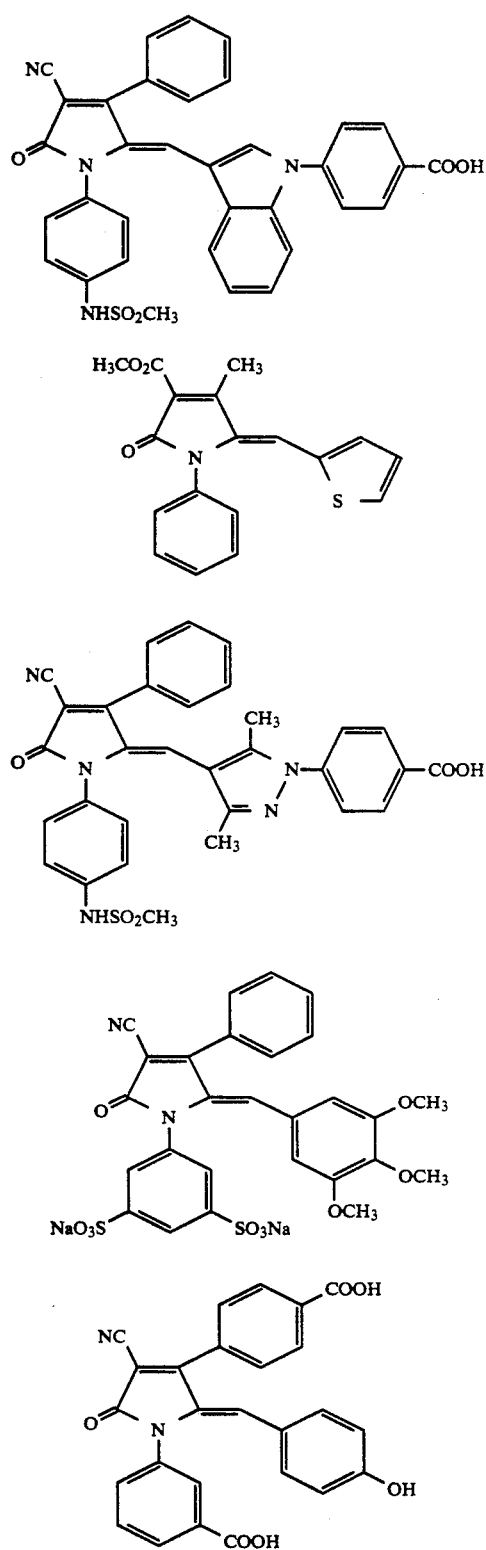
Dye 44
Dye 45
Dye 46
Dye 47
Dye 48
TABLE 3
3-Pyrrolin-2-one Oxonol Dyes
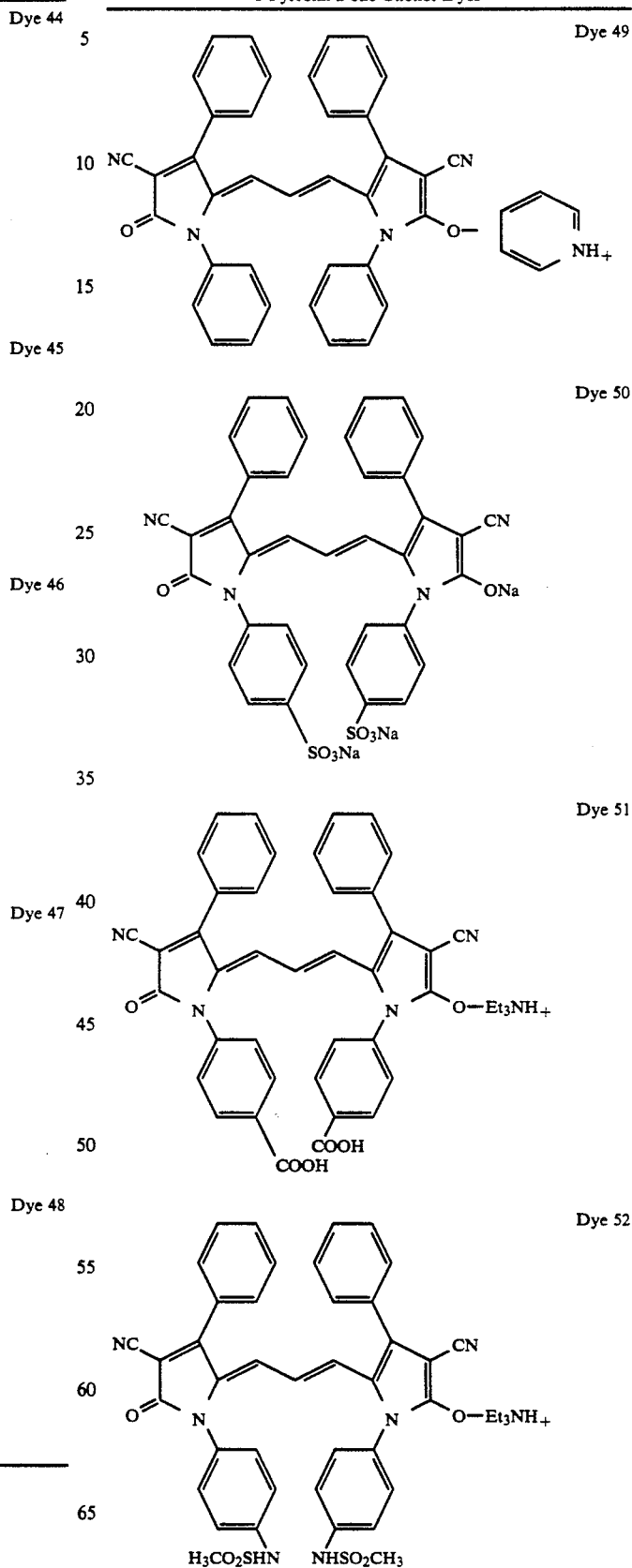
Dye 49
Dye 50
Dye 51
Dye 52

TABLE 3-continued
3-Pyrrolin-2-one Oxonol Dyes
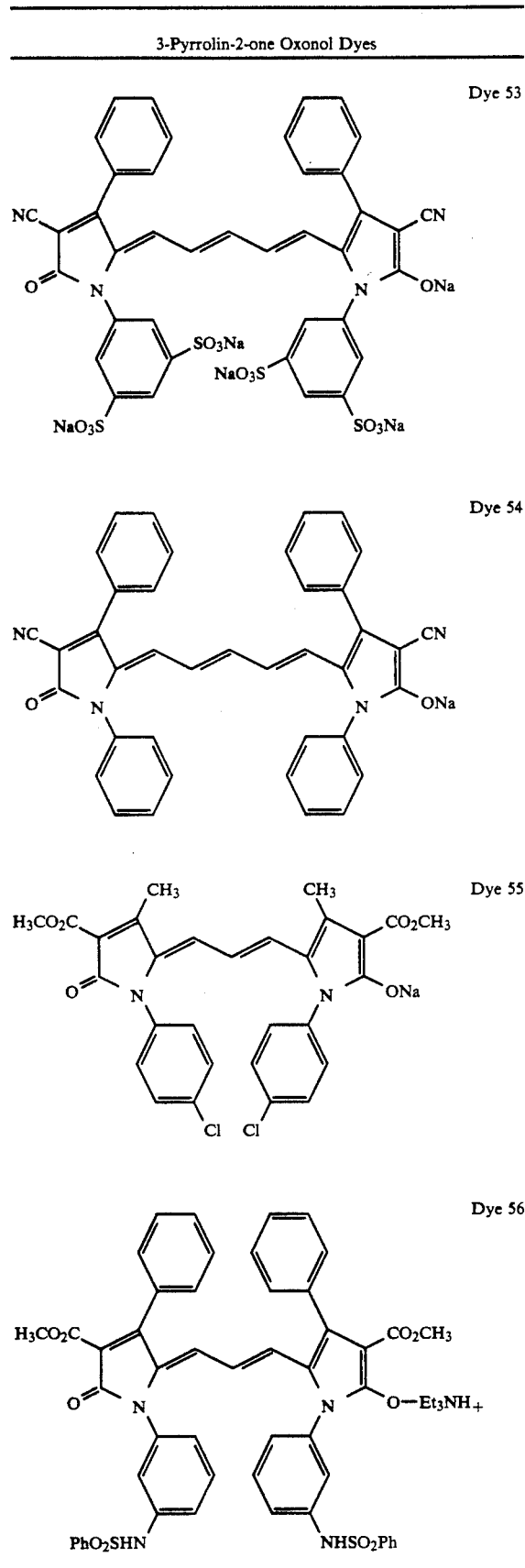
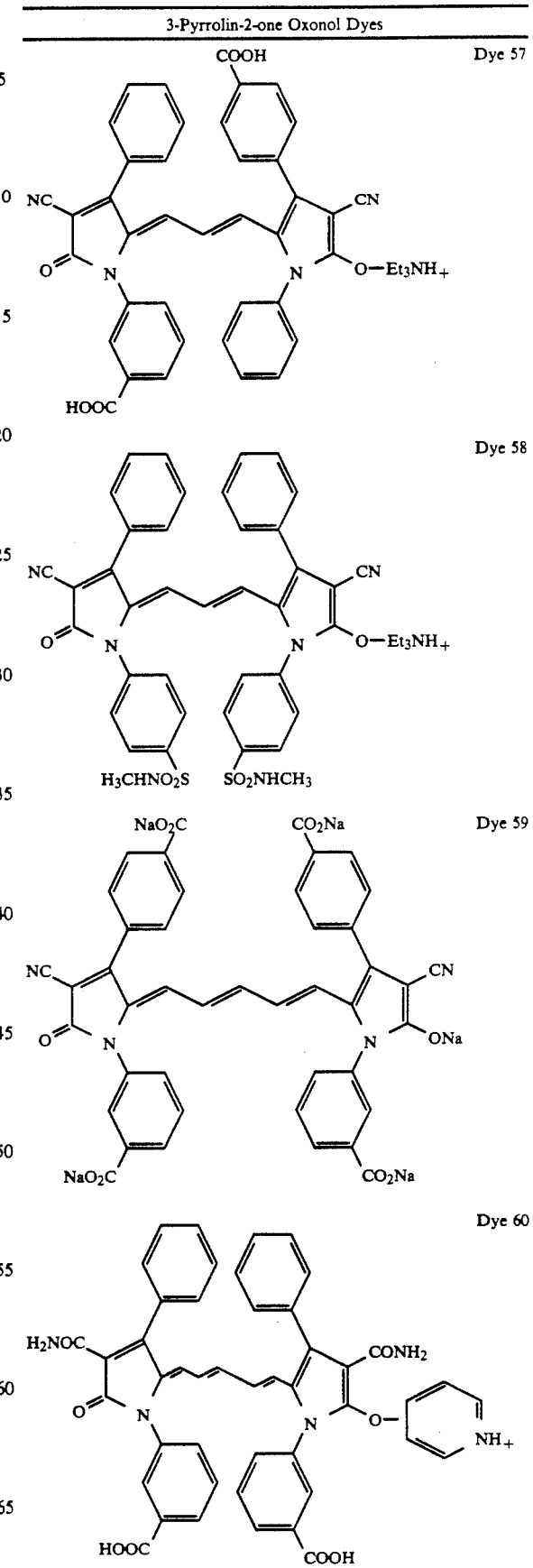

TABLE 3-continued
3-Pyrrolin-2-one Oxonol Dyes
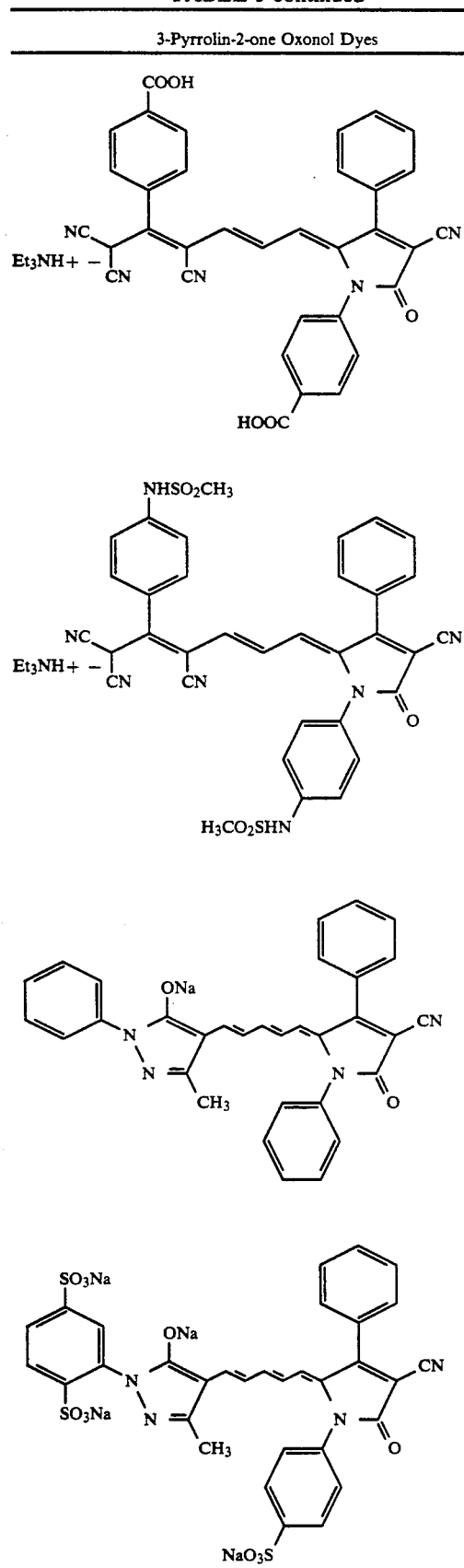
Dye 61
Dye 62
Dye 63
Dye 64
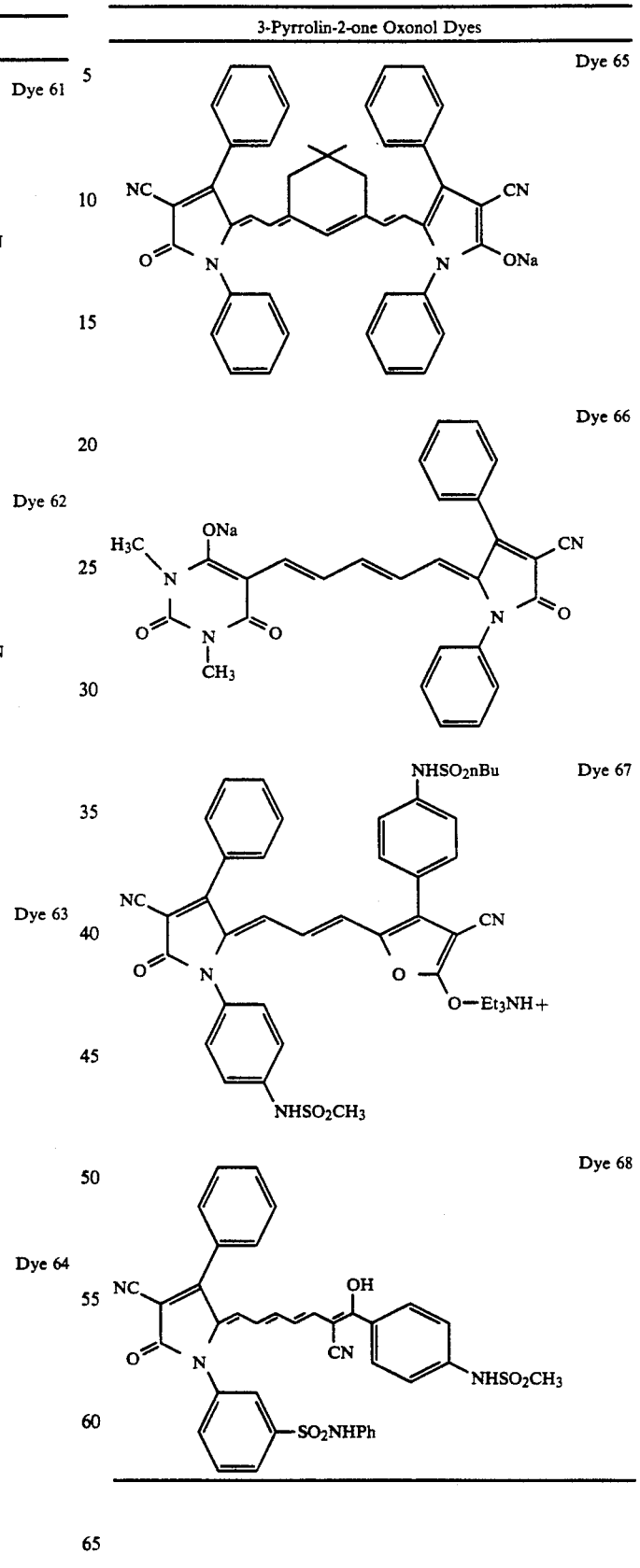
Dye 65
Dye 66
Dye 67
Dye 68

TABLE 4

3-Pyrrolin-2-one Miscellaneous Dyes

Dye 69

Dye 70

Dye 71

Dye 72

The silver halide used in the photographic elements of the present invention may be silver bromoiodide, silver bromide, silver chloride, silver chlorobromide, and the like, which are provided in the form of an emulsion. Particularly, the silver halide emulsion may be at least 90% or 95% silver chloride, or even substantially pure silver chloride (that is, at least 99% silver chloride). In particular, the possibility is also contemplated that the silver chloride could be treated with a bromide solution to increase its sensitivity, although the bulk concentration of bromide in the resulting emulsion will be no more than about 2 to 2.5 mole % and preferably between about 0.6 to 1.2 mole % (that is, the chloride concentration would preferably be 99.4% to 98.2%).

The photographic elements of the present invention may, for example, use tabular grain silver halide emulsions. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 μm (0.5 μm for blue sensitive emulsion) and an average tabularity (T) of greater than 25 (preferably greater than 100), where the term "tabularity" is employed in its art recognized usage as $$T = ECD/t^2$$

where
ECD is the average equivalent circular diameter of the tabular grains in μm and
t is the average thickness in μm of the tabular grains.
The grain size of the silver halide may have any distribution known to be useful in photographic compositions, and may be ether polydispersed or monodispersed.

The silver halide grains to be used in the invention may be prepared according to methods known in the art, such as those described in *Research Disclosure*, (Kenneth Mason Publications Ltd, Emsworth, England) Item 308119, December, 1989 (hereinafter referred to as *Research Disclosure I*) and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in elements of the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Essentially any type of emulsion (e.g., negative-working emulsions such as surface-sensitive emulsions of unfogged internal latent image-forming emulsions, direct-positive emulsions such as surface fogged emulsions, or others described in, for example, *Research Disclosure I*) may be used.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June, 1975, item 13452 and U.S. Pat. No. 3,772,031.

The silver halide may be sensitized by sensitizing dyes using known methods, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours). The sensitizing dyes can be used alone, or may be used in combination with other sensitizing dyes, e.g. to also provide the silver halide with sensitivity to wavelengths of light outside the green region or to supersensitize the silver halide.

Other addenda in the emulsion may include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein. The emulsion may also include brighteners, such as stilbene brighteners. Such brighteners are well-known in the art and are used to counteract dye stain.

An emulsion layer in elements of the present invention may be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white, color negative, color reversal, X-ray film, black and white or color printing paper, or the like. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*.

Photographic elements of the present invention can be processed in any of a number of well-known photographic processes utilizing any of a number of well-known processing compositions, described, for example, in *Research Disclosure I*, or in James, *The Theory of the Photographic Process* 4th, 1977.

The invention is described further in the following Examples.

EXAMPLE 1

Synthesis of 3-Cyano-1,4-diphenyl-3-pyrrolin-2-one

To a solution of 102.44 grams (1.1 mol) of aniline in 500 mL of absolute ethanol stirring at 22° C. was added 99.52 grams (0.5 mol) of 2-bromoacetophenone while maintaining a reaction temperature of 22° C. The reaction was stirred for 1.5 hours at 22° C. during which time a light yellow precipitate formed. The crude product mixture was diluted with 200 mL of ethanol and the precipitated product was collected on a Buchner funnel and washed with 3×200 mL of ethanol, 1×200 mL water, and again 1×200 mL ethanol. The crude product was dried to afford 56.9 grams (0.27 mol, 54% yield) of 2-anilinoacetophenone, m. p.=98°-101° C.

A mixture of 21.1 grams (0.1 mol) of 2-anilinoacetophenone, 31.8 grams (0.28 mol) of ethyl cyanoacetate, and 8 grams (0.13 mol) of ammonium acetate were placed in a reaction flask fitted with a distillation head. The reaction mixture was placed in an oil bath pre-heated to a temperature of 180° C. At a reaction temperature of 100° C. the solid mixture liquified and stirred easily. The internal temperature of the reaction rose to 150° C. over a period of 30 minutes while a colorless distillate was removed. After 30 minutes no further distillate was collected and the product mixture was cooled. To the dark homogeneous liquid product was added 40 mL of absolute ethanol with stirring. The precipitated yellow crystalline product was collected by filtration and washed with 3×10 mL ethanol, 2×25 mL ligroin, and air dried to afford 10.05 grams of crude product. Recrystallization from 80 mL of acetonitrile gave 9.1 grams (35 mmol, 35 % yield) of 3-cyano -1,4-diphenyl-3-pyrrolin-2-one as yellow crystals, m. p.=188°-190° C. Elemental Analysis: Calculated: C=78.44, H=4.65, N=10.76; Found: C=78.36, H=4.90, N=10.81.

EXAMPLE 2

Synthesis of 3-Cyano-1-(4-methanesulfonamidophenyl)-4-phenyl-3-pyrrolin-2-one

4-Methanesulfonamidoaniline (150 g, 0.8 mol) and triethylamine ( 81.4 g, 0.8 mol) were combined with 2.4 liters of 1:1 methanol/ethanol in a five liter round bottom flask, and stirred mechanically until all solids dissolved. 2-Bromoacetophenone (240 g, 1.2 mol) was added as a solid in several portions over a twenty minute period. The reaction was stirred at 25° C. for 14 h, during which an off-white precipitate formed. The mixture was chilled to 5° C., then the product was collected by filtration, washed with cold ethanol and dried under vacuum to yield 152 g (62%) of 2-(4-methanesulfonamidoanilino)acetophenone as an off-white solid, m.p. 165°–167° C. NMR and mass spectral data were consistent with the assigned structure.

2-(4-Methanesulfonamidoanilino)acetophenone (5.0 g, 16.4 mmol), ethyl cyanoacetate (4.5 g, 39.4 mmol) and ammonium acetate (1.5 g, 19.5 mmol) were combined in a 100 mL round-bottomed flask equipped with a magnetic stir bar. The mixture was lowered into a pre-heated 140° C. oil bath, and became a stirrable melt within several minutes. Heating continued for 35 min during which time ethanol and water byproducts were observed boiling off, and a bright yellow solid formed amidst the dark supernatant. The reaction was removed from the heat and allowed to cool to 25° C. under vacuum. The crude material was stirred in ethanol (20 mL) for 30 min, then the product was collected by filtration, washed with more ethanol, and dried to yield 3.0 g (52%) as a bright yellow powder, m.p. 280° C. (dec). NMR and mass spectral data were consistent with the assigned structure. Elemental analysis: Calculated: C=61.18, H=4.28, N=11.89, S=9.07; Found: C=60.77, H=4.33, N=11.66, S=9.14.

EXAMPLE 3

Synthesis of
3-Cyano-4-phenyl-1-(4-sulfophenyl)-3-pyrrolin-2-one, ammonium salt

To a slurry of 34.6 grams (0.2 mol) of sulfanilic acid in 200 mL of anhydrous methanol was added 65.6 grams (0.44 mol) of triethanolamine. The mixture was stirred at 22° C. until all of the sulfanilic acid had dissolved. Then, with continuous stirring, 59.7 grams (0.3 mol) of 2-bromoacetophenone was added portionwise over about one minute. The reaction became fully homogeneous and was stirred at 22° C. for 20 hours. After this time a precipitate of triethanolammonium bromide had formed. The product mixture was diluted with 500 mL of 50% aqueous ethanol and, with rapid stirring, 30 mL of concentrated hydrochloric acid was added in 10 mL portions over 30 minutes. The resulting slurry was stirred for 20 minutes and the precipitated product mixture was collected by filtration. The product mixture was washed with 2×250 mL 50% aqueous ethanol, 1×500 mL ethanol, 1×500 mL dichloromethane, and finally 1×500 mL ligroin and dried to afford 44.5 grams (0.15 mol, 76% yield) of 2-(4-sulfoanilino)acetophenone in 97% purity, m. p.>300° C.

A mixture of 14.5 grams (50 mmol) of 2-(4-sulfoanilino)acetophenone, 45.2 grams (0.4 mol) of ethyl cyanoacetate and 12.2 grams (0.2 mol) of ammonium acetate in a reaction flask fitted with distillation head was stirred and placed in an oil bath pre-heated to 130° C. At an internal temperature of 60° C. the reaction mixture became easily stirrable. Distillate began to collect at 95° C. and the reaction was brought to an internal temperature of 115° C. After 25 minutes the product mixture had become a thick slurry. The product mixture was then cooled, diluted with 100 mL of ethanol and stirred. The tan-yellow product was collected by filtration and washed with ethanol, acetone and ligroin to give a crude weight of product of 10.1 grams. The product was recrystallized from glacial acetic acid to give 9.35 grams (26 mmol, 52% yield) of product as a yellow powder, m. p.=275°–300° C. (decomposes). Elemental Analysis: Calculated: C=57.13, H=4.23, N=11.76, S=8.97; Found: C=57.07, H=4.31, N=11.66, S=8.40.

EXAMPLE 4

Synthesis of 3-Methoxycarbonyl 4-methyl-1-phenyl-3-pyrrolin-2-one

A solution of 51 grams (0.39 mol) of dimethyl malonate, 30 grams of acetone, and 2.5 grams of zinc chloride in 50 mL of acetic anhydride was refluxed with stirring for 24 hours. The solution was poured into ice and water, then extracted with 200 mL of dichloromethane. The organic phase was washed 2×150 mL water, dried over sodium sulfate and concentrated to a brown oil. After two distillations the 41 gram fraction collected at 25°–34° C. (0.1 mm Hg) gave satisfactory analytical for dimethyl isopropylidenemalonate.

A mixture of 26. 4 grams (0.15 mol) of dimethyl isopropylidenemalonate and 27.5 grams (0.15 mol) of n-bromosuccinimide were stirred in 150 mL carbon tetrachloride containing 1.0 grams benzoyl peroxide. The mixture was refluxed for 16 hours under nitrogen. The reaction was cooled in ice and the succinimide was filtered off and washed with carbon tetrachloride. The solvent was removed under reduced pressure to yield 41.3 grams of impure bromomethyl methyl isopropylidenemalonate as an oil which was used without further purification.

A solution of 20.6 grams (82 mmol) of impure bromomethyl methyl isopropylidenemalonate and 15.2 grams (0.169 mol) of aniline in 25 mL of absolute ethanol were stirred at room temperature. Initially a homogeneous solution formed. After a mildly exothermic reaction a precipitate formed. The reaction was refluxed for 1 hour, cooled, and filtered. The collected product was washed with ethanol and water to give 10.0 grams (43 mmol, 52% yield) of crude product. An analytical sample was prepared by recrystallizing from methanol, m. p.=143°–145° C., Elemental Analysis: Calculated: C=67.5, H=5.7, N=6.1; Found: C=67.7, H=5.9, N=6.2.

EXAMPLE 5

Synthesis of Dye 1

To a slurry of 6.5 grams (15 mmol) of 2-(2-acetanilidovinyl)-3-ethylbenzoxazolium iodide and 3.9 grams (15 mmol) of 3-cyano-1,4-diphenyl-3-pyrrolin-2-one in 100 mL of ethanol was added 3.0 grams (30 mmol) of triethylamine. The mixture was stirred and heated to reflux. After 1.5 hours the crude product mixture was chilled in ice for 1 hour. The precipitated solid was collected and washed with ethanol to give 5.4 grams (12.5 mmol, 83% yield) of Dye 1 in 100% purity as determined by high pressure liquid chromatography, absorbance max 523 nm (MeOH), extinction max=128,700, m. p.=260°–262° C. Elemental Analysis: Calculated: C=77.94, H=4.91, N=9.74; Found: C=77.82, H=4.87, N=9.70.

EXAMPLE 6

Synthesis of Dye 3

3-Cyano-1-(4-carboxyphenyl)-4-phenyl-3-pyrrolin-2-one (5.0 g, 16.4 mmol) and 2-(2-acetanilidovinyl)-5-carboxy-3-methylbenzoxazolium p-tolunesulfonate (8.4 g, 16.4 mmol) were combined in a mixture of 20 mL ethanol and 12 mL dimethylsulfoxide. Triethylamine (5.1 g, 51 mmol) was added and the stirring mixture was heated to reflux and held for 15 minutes. Acetic acid (10 mL) was added, and the red solution was heated at reflux for 10 minutes longer before being allowed to cool to 25° C., then filtered to yield 8.3 g (100%) of a brick red solid. The dye was purified by refluxing in acetic acid for 40 min, then dried to yield 7.2 g (87%) of Dye 3 as a red, fluffy solid, absorbance maximum = 525 nm (MeOH+1 drop Et$_3$N), extinction maximum = 117,600, m. p. > 300° C. NMR, IR and mass spectral data were consistent with the assigned structure, and HPLC analysis showed the dye to be >98% pure.

EXAMPLE 7

Synthesis of Dye 4

3-Cyano-1-(4-methanesulfonamidophenyl)-4-phenyl-3-pyrrolin-2-one (2.3 g, 6.5 mmol) and 2-(2-acetanilidovinyl)-5-carboxy-3-methylbenzoxazolium p-tolunesulfonate (3.3 g, 6.5 mmol) were combined in a mixture of 20 mL ethanol and 12 mL dimethylsulfoxide. Triethylamine (1.4 g, 13.8 mmol) was added and the stirring mixture was heated to reflux and held for 10 minutes. Acetic acid (5 mL) was added, and the red solution was allowed to cool to 25° C. with stirring, then chilled on ice and filtered to yield 3.5 g (97%) of red solid. The dye was purified by refluxing in acetic acid for 30 min, then dried to yield 2.4 g (67%) of Dye 4 as a red, fluffy solid, absorbance maximum = 524 nm (MeOH+1 drop Et$_3$N), extinction maximum = 133,800, m. p. > 300° C. NMR, IR and mass spectral data were consistent with the assigned structure, and HPLC analysis showed the dye to be >99% pure.

EXAMPLE 8

Synthesis of Dye 10

To a slurry of 1.33 grams (5.0 mmol) of 1-(4-chlorophenyl) -3-methoxycarbonyl-4-methyl-3-pyrrolin-2-one and 2.17 grams (5.0 mmol) of 2-(2-acetanilidovinyl)-3-ethylbenzoxazolium iodide in 25 mL of ethanol was added 1.0 grams (10 mmol) of triethylamine. The reaction mixture was refluxed for 40 minutes and then chilled in ice. The red solid product was collected by filtration, washed with ethanol, and dried to give 1.4 grams (3.2 mmol, 64% yield) of Dye 10, absorbance max = 506 nm (MeOH), extinction max = 113,000, m. p. = 268°–271° C. Elemental Analysis: Calculated: C=66.0, H=4.87, N=6.42, Cl=8.15; Found: C=65.6, H=5.2, N=6.4, Cl=7.9.

EXAMPLE 9

Synthesis of Dye 26

To a slurry of 1.93 grams (11 mmol) of dimethylaminocinnamaldehyde and 2.6 grams (10 mmol) of 3-cyano-1,4-diphenyl-3-pyrrolin-2-one in 40 mL of toluene was added 0.43 grams (5 mmol) of piperidine and 0.46 grams (7.5 mmol) of glacial acetic acid. The reaction mixture was heated to reflux with simultaneous Dean-Stark trap water removal. After two hours, water collection was complete and the product mixture was chilled in ice for 30 minutes. The crystalline product was collected by filtration and recrystallized from 50 mL of acetonitrile to afford 2.0 grams (4.7 mmol, 47% yield) of Dye 26 as metallic green needles, absorbance max = 545 nm (MeOH), extinction max = 48,000, m. p. = 230°–232° C. Elemental Analysis: Calculated: C=80.55, H=5.55, N=10.06; Found: C=80.36, H=5.21, N=10.06.

EXAMPLE 10

Synthesis of Dye 27

3-Cyano-1-(4-carboxyphenyl)-4-phenyl-3-pyrrolin-2-one (80 g, 26.3 mmol) and p-dimethylaminobenzaldehyde (4.7 g, 31.5 mmol) were dissolved in 50 mL dimethylsulfoxide. Ammonium acetate (1.8 g, 23 mmol) was added, and the stirring solution was heated to 100° C. and held at that temperature for 15 minutes. The resulting deep red solution, allowed to cool to 70° C. with stirring, was then diluted with a mixture of 20 mL methanol and 5 mL acetic acid and cooled to 25° C. A shimmering precipitate formed. The mixture was chilled on ice, and the precipitated dye collected by filtration and washed with cold methanol to yield 8.3 g (72%) of Dye 27 as a brass-colored powder. This material was recrystallized from acetonitrile and dried to yield 5.7 g (50%) of red crystals, absorbance maximum = 499 nm (CH$_3$CN), extinction maximum = 34,600, m. p. = 178°–181° C. (decomp.). NMR, IR and mass spectral data were consistent with the assigned structure, and HPLC analysis showed the dye to be >99% pure. Elemental analysis: Calculated: C=74.47, H=4.86, N=9.65; Found: C=73.47, H=4.88, N=9.40.

EXAMPLE 11

Synthesis of Dye 28

3-Cyano-1-(4-carboxyphenyl)-4-phenyl-3-pyrrolin-2-one (8.0 g, 26.3 mmol) and p-dimethylaminocinnamaldehyde (5.5 g, 31.5 mmol) were dissolved in 50 mL dimethylsulfoxide. Ammonium acetate (2.2 g, 29 μmol) was added, and the stirring solution was heated to 100° C. producing a deep blue-black solution. After 10 minutes of heating, the dye precipitated from the reaction. The hot mixture was diluted with 100 mL methanol and 5 mL acetic acid, then removed from the heat and allowed to cool to 25° C. The mixture was chilled on ice, and the dye collected by filtration, washed with methanol, and dried to afford 11.2 g (93%) of dye as a green crystalline solid. This material was recrystallized from acetonitrile and dried to yield 9.6 g (80%) of Dye 28 as a chunky green solid, absorbance maximum = 532 nm (CH$_3$CN), extinction maximum = 47,100, m. p. = 267°–269° C. (decomp.). NMR, IR and mass spectral data were consistent with the assigned structure, and HPLC analysis showed the dye to be 99% pure. Elemental analysis: Calculated: C=75.47, H=5.02, N=9.10; Found: C=74.95, H=5.03, N=8.89.

EXAMPLE 12

Synthesis of Dye 29

3-Cyano-1-(4-methanesulfonamidophenyl)-4-phenyl-3-pyrrolin-2-one (6.0 g, 17 mmol) and p-dimethylaminobenzaldehyde (3.0 g, 20.4 mmol) were dissolved in 20 mL dimethylsulfoxide. Ammonium acetate (1.3 g, 17 mmol) was added, and the stirring solution was heated to 100° C. and held at that temperature for 30 minutes. The resulting deep red solution, allowed to cool to 75° C. with stirring, was then diluted with 20 mL methanol and cooled to 25° C. over 90 minutes. The mixture was chilled on ice, and the precipitated dye collected by filtration and washed with cold methanol to yield 6.8 g (83%) of Dye 29 as a sparkling green powder. This material was recrystallized from acetonitrile and dried to yield 5.3 g (65%) of copper-colored crystals, absorbance maximum=507 nm (MeOH), extinction maximum=35,500, m. p.=278°-280° C. NMR, IR and mass spectral data were consistent with the assigned structure, and HPLC analysis showed the dye to be >99% pure. Elemental analysis: Calculated: C=66.92, H=4.99, N=11.56; Found: C=66.65, H=4.99, N=11.56.

EXAMPLE 13

Synthesis of Dye 30

3-Cyano-1-(4-methanesulfonamidophenyl)-4-phenyl-3-pyrrolin-2-one (8.0 g, 22.6 mmol) and p-dimethylaminocinnamaldehyde (4.8 g, 27.2 mmol) were dissolved in 50 mL dimethylsulfoxide. Ammonium acetate (1.7 g, 22 mmol) was added, and the stirring solution was heated to 100° C. producing a deep purple solution. The reaction was heated for 10 minutes, allowed to cool to 60° C., then diluted with 100 mL methanol. After 10 minutes of stirring the dye precipitated from the reaction, and was collected by filtration, washed with methanol, and dried to afford 10.0 g (87%) of dye as a blue-/green solid. This material was recrystallized from acetonitrile and dried to yield 7.3 g (63%) of Dye 30 as a chunky green solid, absorbance maximum=529 nm (MeOH), extinction maximum=46,500, m. p.=295°-296° C. (decomp.). NMR, IR and mass spectral data were consistent with the assigned structure, and HPLC analysis showed the dye to be >99% pure. Elemental analysis: Calculated: C=68.22, H=5.13, N=10.97; Found: C=8.14, H=5.16, N=10.84.

EXAMPLE 14

Synthesis of Dye 36

To a slurry of 1.65 grams (11 mmol) of piperonal and 2.60 grams (10 mmol) of 3-cyano-1,4-diphenyl-3-pyrrolin-2-one in 40 mL of toluene was added 0.43 grams (5 mmol) of piperidine and 0.46 grams (7.5 mmol) of glacial acetic acid. The reaction mixture was heated to reflux with simultaneous Dean-Stark trap water removal. The reaction was refluxed for 20 hours then cooled to room temperature and poured into 500 mL of ligroin. The crude product was collected by filtration, dissolved in acetone and precipitated with water, then recrystallized from 400 mL of methanol to afford 2.25 grams (5.7 mmol, 57% yield) of Dye 36 as an orange crystalline powder, absorbance max=417 nm (MeOH), extinction max=20,000, m. p.=196°-197° C. Elemental Analysis: Calculated: C=76.52, H=4.11, N=7.14; Found: C=76.46, H=4.33, N=7.12.

EXAMPLE 15

Synthesis of Dye 50

A slurry of 3.6 grams (10 mmol) of 3-cyano-4-phenyl-1-(4-sulfophenyl)-3-pyrrolin-2-one, ammonium salt and 3.5 grams (35 mmol) of triethylamine in 20 mL of isopropyl alcohol was heated to reflux and 0.8 grams (6 mmol) of trimethoxypropene was added. After 1.5 hours at reflux an additional 0.4 grams (3 mmol) of trimethoxypropene was added, and finally after another 30 minutes reflux an additional 0.4 grams (3 mmol) of trimethoxypropene was added. After a total of 2.5 hours reflux the product mixture was chilled in ice for 30 minutes and the supernatant decanted from the dark gummy product. The crude gummy product was dissolved in 25 mL absolute ethanol at reflux and treated with a solution of 6.0 grams (40 mmol) of sodium iodide in 10 mL of methanol. The resulting bronze colored powder product was collected by filtration after cooling to 50° C. and washed with ethanol and ligroin. The crude dye was dissolved in water and precipitated from acetone, then dissolved in 50 mL methanol at reflux and filtered while hot. The filtrate was poured into 400 mL acetone, chilled at 2° C., and the product collected by filtration to afford 1.95 grams (2.4 mmol, 24% yield) of Dye 50 as a bronze powder in 99% purity as determined by high pressure liquid chromatography, absorbance max=671 nm (H$_2$O), extinction max=118,400, m. p.>300° C.

EXAMPLE 16

Synthesis of Dye 62

3-Cyano-1-(4-methanesulfonamidophenyl)-4-phenyl-3-pyrrolin-2-one (5.0 g, 14.1 mmol) and 6-methoxy-2-(4-methanesulfonamido)phenyl-1,1,3-tricyanohexatriene (5.0 g, 14.1 mmol) were combined in 100 mL ethanol and stirred mechanically. Triethylamine (4.3 g, 42.3 mmol) was added as a single portion, producing a blue solution which was brought to reflux and held for 10 minutes. Upon cooling to 25° C., a precipitate formed. The mixture was chilled to 0° C., and the precipitated dye collected and washed with cold ethanol to yield the crude dye as a forest green powder. This material was dissolved in boiling acetic acid, and the resulting solution cooled to 10° C. The precipitated dye was collected by filtration and dried to yield 8.6 g (79%) of Dye 62 as a fluffy green solid, absorbance maximum=637 nm (MeOH), extinction maximum=88,300. NMR, IR and mass spectral data were consistent with the assigned structure, and HPLC analysis showed the dye to be >99% pure.

TABLE 5

Solution absorbance maxima for representative examples of merocyanine, arylidene and oxonol dyes derived from 3-pyrrolin-2-ones.

| Dye No. | λ max | Solvent |
|---|---|---|
| 1 | 523 nm | MeOH |
| 3 | 525 nm | MeOH |
| 4 | 524 nm | MeOH |
| 5 | 525 nm | MeOH-pyridine |
| 10 | 506 nm | MeOH |
| 12 | 523 nm | MeOH |
| 18 | 560 nm | MeOH-pyridine |
| 19 | 660 nm | MeOH-pyridine |
| 20 | 540 nm | MeOH |
| 21 | 607 nm | MeOH |
| 22 | 580 nm | MeOH |
| 24 | 542 nm | MeOH |
| 25 | 507 nm | MeOH |
| 26 | 545 nm | MeOH |
| 27 | 499 nm | CH$_3$CN |
| 28 | 532 nm | CH$_3$CN |
| 29 | 507 nm | MeOH |
| 30 | 529 nm | MeOH |
| 34 | 528 nm | MeOH |
| 35 | 556 nm | MeOH |
| 36 | 417 nm | MeOH |
| 37 | 470 nm | MeOH |
| 38 | 416 nm | MeOH |
| 49 | 679 nm | MeOH |
| 50 | 671 nm | MeOH |
| 54 | 793 nm | MeOH |
| 61 | 636 nm | MeOH |
| 62 | 637 nm | MeOH |
| 63 | 698 nm | MeOH |
| 69 | 423 nm | MeOH |

A number of the pyrrolinone dyes of the present invention (in solid particle format) were coated in gelatin. The absorbance maximum were then measured, along with density at the maximum both before and after a 5 minute distilled water wash and after processing in the Kodak Process E-6 (described, for example, in *British Journal of Photography*, 1988, p. 193-196. The results are provided in Table 6 below.

TABLE 6

| | | Optical Density at $\lambda_{max}$ | | |
|---|---|---|---|---|
| Dye | $\lambda_{max}$ at Optical Density Maximum | Before Processing | After 5 minute Distilled Water Wash | After Process E-6 |
| 3 | 564 nm | 1.353 | 1.273 | 0.010 |
| 4 | 506 nm | 1.227 | 1.326 | 0.012 |
| 27 | 595 nm | 0.941 | 0.927 | 0.010 |
| 29 | 513 nm | 0.568 | 0.600 | 0.011 |

It will be noted from Table 6 that solid particle dyes of the present invention can function as filter dyes which are not readily water solubilized but which are substantially completely removed in a standard processing method.

The invention has been described in detail with particular reference to preferred embodiments, but it will be understood that variations and modifications can be effected within the spirit and scope of the invention.

What is claimed is:

1. A photographic element containing a radiation-sensitive silver halide emulsion layer and a 3-pyrrolin-2-one dye, which dye has a 3-position electron withdrawing group, and a moiety in conjugation with the 2-position oxygen which moiety is linked to the pyrrolinone ring 5-position through a substituted or unsubstituted methine bridge, and in which dye the pyrrolinone ring nitrogen has a substituent other than hydrogen.

2. A photographic element containing a radiation-sensitive silver halide emulsion layer and a dye of the formula:

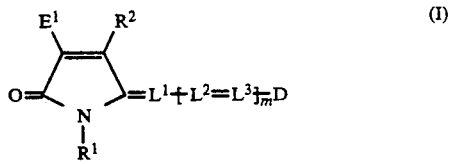

wherein;
 $E^1$ represents an electron withdrawing group;
 $R^1$ represents an aryl group of 6 to 14 carbon atoms or an alkyl group of 1 to 12 carbon atoms;
 $R^2$ represents an alkyl group of 1 to 20 carbon atoms, or an alkenyl group of 2 to 20 carbon atoms, or an aryl, aralkyl, heterocyclic or cycloalkyl group of 5 to 14 carbon atoms, or a hydroxy, cyano, chloro, nitro or hydrogen;
 each L represents a methine group;
 m is 0, 1, 2, or 3; and D is a moiety in conjugation with the oxygen of the pyrrolinone ring.

3. A photographic element according to claim 2, wherein D contains an atom with an available electron pair positioned in conjugation with the oxygen of the pyrrolinone ring which atom si an O, N, Se or S, or is a C with at least one electron withdrawing group bonded thereto, or D is a group containing a benzene ring.

4. A photographic element according to claim 2 wherein D contains an O or N atom or —C(CN)2 position in conjugation with the oxygen of the pyrrolinone ring.

5. A photographic element according to claim 2 wherein D is any one of the following:

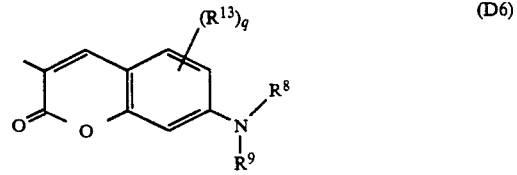

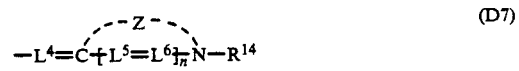

and wherein:
 $E^2$ represents an electron withdrawing group;
 $R^3$ represents an aryl group of 6 to 14 carbon atoms or an alkyl group of from 1 to 12 carbon atoms;
 $R^4$ represents an alkyl or alkylthio group of 1 to 20 carbon atoms, or an alkenyl group of 2 to 20 carbon atoms, or an aryl, aralkyl, heterocyclic or cycloalkyl group of 5 to 14 carbon atoms or a hydroxy, cyano, chloro, nitro or hydrogen;
 $R^5$ represents an alkyl group o f1 to 20 carbon atoms or an alkenyl group of 2 to 20 carbon atoms, or an aryl, aralkyl or cycloalkyl group of 5 to 14 carbon atoms, and $R^6$ represents cyano, or an aryl, aminocarbonyl, or alkoxycarbonyl group of 2 to 20 carbon atoms, or an alkylsulfonyl, arylsulfonyl, or sulfamoyl group of 1 to 20 carbon atoms, or $R^5$ and $R^6$ may together represent the non-metallic atoms necessary to complete a substituted or unsubstituted ring containing at least one 5- or 6-membered heterocyclic or unsaturated alicyclic nucleus;

$R^7$, $R^{10}$, $R^{11}$, $R^{12}$ and $R^{13}$ each individually represents hydrogen, carboxy, carboxyalkyl, sulfonamido, sulfamoyl, or an alkyl, aralkyl, cycloalkyl, alkoxy, alkylamino, or alkylthio group of 1 to 10 carbon atoms;

$R^8$, $R^9$, $R^{15}$, and $R^{16}$ each individually represents an alkyl group of 1 to 20 carbon atoms or an alkenyl group of 2 to 8 carbon atoms, or an aryl, aralkyl or cycloalkyl group of 5 to 14 carbon atoms, or $R^8$ and $R^9$, or $R^{15}$ and $R^{16}$ together represent the non-metallic atoms required to form a substituted or unsubstituted 5- or 6-membered ring with each other, or $R^8$ and $R^9$ individually represent the non-metallic atoms necessary to form a substituted or unsubstituted 5- or 6-membered fused ring with the phenyl ring to which the nitrogen is attached;

$R^{14}$ represents an alkyl group of 1 to 20 carbon atoms, or an aralkyl or cycloalkyl group of 5 to 10 carbon atoms;

G represents —O or —C(CN)$_2$;

Y and Z each individually represents the non-metallic atoms necessary to complete a group containing at least one 5- or 6-membered heterocyclic ring;

M$^+$ is a cation;

$L^1$ through $L^6$ each individually represents a methine group;

m is 0, 1, 2, or 3;

n is 0 or 1;

p is 0, 1, 2, 3, or 4;

q is 0, 1, 2, or 3;

r is 0, 1, 2, 3, 4, or 5; and s is 0, 1, or 2.

6. A photographic element according to claim 4 wherein (D4) is of the structure:

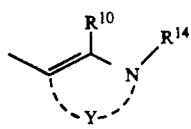
(D9)

7. A photographic element according to claim 2 wherein the dye has at least one carboxy, sulfonamido, sulfamoyl, sulfato, or sulfo substituent.

8. A photographic element according to claim 2 wherein $R^1$ or D has at least one carboxy, sulfonamido, sulfamoyl, sulfato, or sulfo substituent.

9. A photographic element according to claim 2 wherein D2 is an active methylene moiety derived from the group consisting of benzoylacetonitrile, 2-pyrazolin-5-one, pyrazolidindione, barbituric acid, rhodanine, indandione, isoxazolinone, benzofuranone, chromandione, cyclohexanedione, dioxanedione, furanone, pyrazolopyridine, pyridone, isoxazolidinedione, pyrandione, and tricyanopropene.

10. A photographic element according to claim 4 wherein Y represents the atoms necessary to complete a pyrazole, indole, furan, or thiophene nucleus.

11. A photographic element according to claim 4 wherein Z represents the atoms necessary to complete a benzoxazole or a benzothiazole nucleus.

12. A photographic element according to claim 4 wherein $E^1$ or $E^2$ is cyano, acyl, phenacyl, aminocarbonyl, or alkoxycarbonyl.

13. A photographic element according to claim 2 wherein $E^1$ is cyano.

14. A photographic element according to claim 4 wherein $E^1$ and $E^2$ are cyano.

15. A photographic element according to claim 4 wherein $L^1$ through $L^6$ are CH.

16. A photographic element according to claim 2 wherein said dye is a filter dye which is in a hydrophilic layer different from said radiation-sensitive layer, said hydrophilic layer being located on the same side of the support as said radiation sensitive layer.

17. A photographic element according to claim 2 wherein said dye is a filter dye which is in a hydrophilic layer different from said radiation-sensitive layer, said hydrophilic layer being located on the side of the support opposite to said radiation-sensitive layer.

18. A photographic element according to claim 16 wherein said filter dye is in the form of a dispersion of solid particles.

19. A photographic element according to claim 18 wherein said particles have a mean diameter from 0.01 to 100 micrometers.

20. A photographic element according to claim 17 wherein said filter dye is in the form of a dispersion of solid particles.

21. A photographic element according to claim 20 wherein said particles have a mean diameter from 0.01 to 100 micrometers.

22. A photographic element according to claim 16 wherein said filter dye is dissolved in said hydrophilic layer.

23. A photographic element according to claim 17 wherein said filter dye is dissolved in said hydrophilic layer.

24. A photographic element containing a radiation-sensitive silver halide emulsion layer and a dye of the formula:

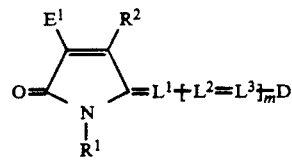
(I)

in which D is selected from any of the following:

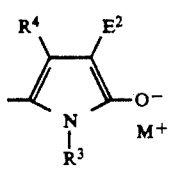
(D1)

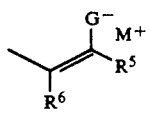
(D2)

-continued

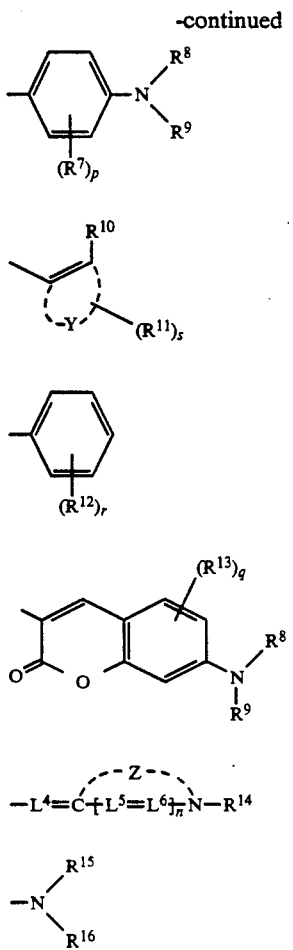

wherein:

$E^1$ and $E^2$ are independently cyano, acyl, phenacyl, aminocarbonyl or alkoxycarbonyl groups;

$R^1$ and $R^3$ are independently aryl groups;

$R^2$ and $R^4$ independently represent an alkyl or cycloalkyl group of 1 to 8 carbon atoms or a phenyl group;

$M^+$ is a cation;

each L represents a methine group;

m is 0, 1, 2, or 3;

D2 is an active methylene moiety derived from the group consisting of benzoylacetonitrile, 2-pyrazolin-5-one, pyrazolidindione, barbituric acid, rhodanine, indandione, isoxazolinone, benzofuranone, chromandione, cyclohexanedione, dioxanedione, furanone, pyrazolopyridine, pyridone, isoxazolidinedione, pyrandione, and tricyanopropene;

$R^7$, $R^{10}$, $R^{11}$, $R^{12}$ and $R^{13}$ each individually represents hydrogen, carboxy, carboxyalkyl, sulfonamido, sulfamoyl, or an alkyl, aralkyl, cycloalkyl, alkoxy, alkylamino, or alkylthio group of 1 to 10 carbon atoms;

$R^8$, $R^9$, $R^{15}$, and $R^{16}$ each individually represents an alkyl group of 1 to 20 carbon atoms or an alkenyl group of 2 to 8 carbon atoms, or an aryl, aralkyl or cycloalkyl group of 5 to 14 carbon atoms, or $R^8$ and $R^9$, or $R^{15}$ and $R^{16}$ together represent the non-metallic atoms required to form a substituted or unsubstituted 5- or 6-membered ring with each other, or $R^8$ and $R^9$ individually represent the non-metallic atoms necessary to form a substituted or unsubstituted 5- or 6-membered fused ring with the phenyl ring to which the nitrogen is attached;

$R^{14}$ represents an alkyl group of 1 to 8 carbon atoms, or an aralkyl or cycloalkyl group of 5 to 10 carbon atoms;

Y represents the atoms necessary to complete a pyrazole, indole, furan, or thiophene nucleus;

Z represents the atoms necessary to complete a benzoxazole or a benzothiazole nucleus.

25. A photographic element according to claim 24 which has at least one carboxy, sulfonamido, sulfamoyl, sulfato, or sulfo substituent.

26. A photographic element according to claim 24 wherein $R^1$ or D has at least one carboxy, sulfonamido, sulfamoyl, sulfato, or sulfo substituent.

* * * * *

UNITED STATES PATENT AND TRADEMARK OFFICE
CERTIFICATE OF CORRECTION

PATENT NO. : 5,283,165
DATED : February 1, 1994
INVENTOR(S) : Donald R. Diehl, et al It is certified that error appears in the above-indentified patent and that said Letters Patent is hereby corrected as shown below:

```
Column 33, line 64, after atom, "si" should read
--is--.

Column 34, line 62, after group, "o fl" should read
--of 1--.
```

Signed and Sealed this

Fifth Day of July, 1994

Attest:

BRUCE LEHMAN

Attesting Officer

Commissioner of Patents and Trademarks